Aug. 7, 1951 — P. A. FASOLI — 2,563,778
BEARING
Filed Jan. 24, 1949

INVENTOR.
Paul A. Fasoli

Patented Aug. 7, 1951

2,563,778

UNITED STATES PATENT OFFICE 2,563,778

BEARING

Paul A. Fasoli, Hudson Falls, N. Y., assignor to The Sandy Hill Iron & Brass Corporation, Hudson Falls, N. Y., a corporation of New York Application January 24, 1949, Serial No. 72,419

1 Claim. (Cl. 308—184)

My invention relates to bearings and is directed more particularly to improvements in bearings for table rolls of paper making machines and the like.

The principal objects of the invention are directed to the provision of a bearing which is economical to produce, is efficient in its use and is adapted for long life.

The table rolls which support the Fourdrinier wire of a paper machine rotate at high speed. Vibrations are usually present. Water of the paper making stock tends to enter the bearing, and the conditions of service are generally severe.

According to the novel features of my invention, a bearing construction is provided which is adapted for high speed rotation of the table roll, is sealed against the entrance of water, and eliminates vibrations by absorbing and reducing the mechanical shock introduced by the shaking action of the Fourdrinier.

Figure 1:
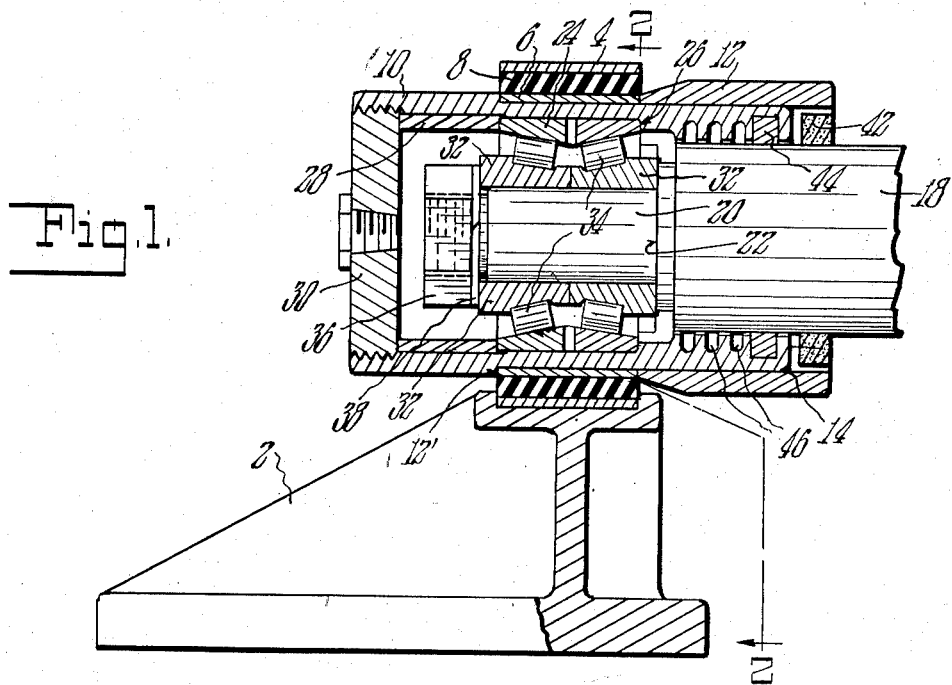
Figure 2:
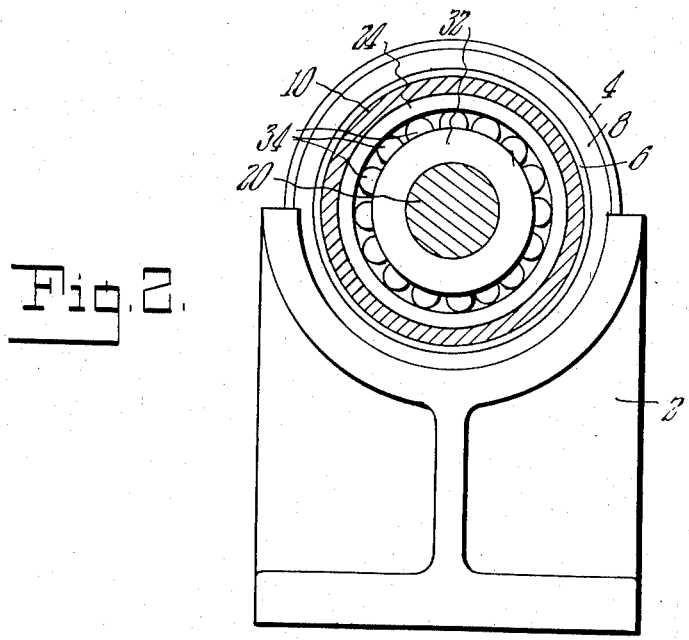

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawings wherein:

Fig. 1 is a longitudinal sectional elevational view through a bearing construction embodying the novel features of the invention; and Fig. 2 is a sectional elevational view on the line 2—2 of Fig. 1.

Referring now to the drawings more in detail, the invention will be fully described.

A support 2 is provided which may be secured to the rails of a paper machine and has an upper portion for supporting the bearing construction of the invention.

An outer shell 4 and an inner sleeve 6 are provided and have a yieldable ring 8 therebetween. The sleeve 6 and shell 4 are of metal and the ring 8 is formed from a resilient or yieldable material. These parts may be secured together in any suitable manner.

A tubular housing 10 supports the sleeve 6 and a tubular inner ring 12 on the housing 10 engages the sleeve 6 on its inner end. The sleeve 6 abuts a shoulder 12' on the housing, as shown.

The members 10 and 12 are secured together as by welding at 14 as shown.

The shaft of a table roll is represented by 18 which has a reduced portion 20 and a shoulder 22.

The outer race 24 of an anti-friction bearing within the housing 10 abuts a shoulder 26 thereof, and a spacer 28 is held against the race 24 by means of a cover member 30 in screwthreaded engagement with the housing 10.

The reduced portion 20 of the shaft 18 has inner races 32 thereon and there are rolls 34 between the races 24 and 32.

A nut 36 and washer 38 on the threaded end of the shaft hold the inner races 32 against the shoulder 22.

Sealing rings 42 and 44 are provided which cooperate with grooves 46 to prevent the entrance of water into the bearing.

The outer shell 4 may or may not be secured to the upper portion of the support 2 as may be desired.

Thus the shaft is mounted for rotation at high speed while by means of the member 8 it is cushioned to absorb shock due to axial vibration of the table roll which in turn is due to the shaking motion of the Fourdrinier. The member 8 may be formed from rubber, rubber composition, or the like.

Such a mounting permits alignment of the bearing giving support across the entire bearing without super-imposing eccentric loads.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

The combination of the shaft end of a table roll with bearing means therefor comprising in combination, a support having an axial bore, an elongated yieldable annulus of a certain length therein, an inner annular sleeve of said certain length concentrically disposed within said yieldable annulus, an elongated tubular housing concentrically disposed within said inner sleeve and having opposite ends extending therebeyond, a shoulder provided on one end of said housing engaging one end of said sleeve, an inner ring around and secured to one end of said housing engaging an opposite end of said sleeve, said shoulder and ring holding said sleeve and housing against relative axial movements, shaft sealing means at the inner end of said housing, a cover closing the outer end of said housing, an anti-friction bearing having an outer annular race in said housing in radial alignment with said yieldable annulus and an inner annular race in which said shaft end is disposed, and means at opposite ends of said outer race holding said housing and race against relative axial movement, said means including a shoulder provided in said housing at one end of said race and an annular spacer between the opposite end of said race and said cover.

PAUL A. FASOLI.

REFERENCES CITED

The following references are of record in the file of this patent:

UNITED STATES PATENTS

| Number | Name | Date |
|---|---|---|
| 1,060,246 | Gee | Apr. 29, 1913 |
| 1,851,561 | Baninger | Mar. 29, 1932 |
| 2,092,291 | Olsen | Sept. 7, 1937 |
| 2,102,415 | Herreshoff | Dec. 14, 1937 |